United States Patent [19]

Aloia

[11] 3,976,611

[45] Aug. 24, 1976

[54] FREE-FLOWING BEADS OF PARTICLES OF AN ACRYLATE ELASTOMER

[75] Inventor: Romeo Raymond Aloia, Bridgewater Township, Somerset County, N.J.

[73] Assignee: American Cyanamid Company, Stamford, Conn.

[22] Filed: Dec. 9, 1974

[21] Appl. No.: 530,788

[52] U.S. Cl. .............................. 260/23 AR; 526/5; 526/328; 526/332
[51] Int. Cl.$^2$ ................ C08L 91/00; C08F 224/00; C08F 220/42; C08F 218/00
[58] Field of Search........... 260/80.72, 80.76, 80.81, 260/85.5 ES, 86.1 E, 86.1 N, 23 AR

[56] References Cited
UNITED STATES PATENTS

| | | | |
|---|---|---|---|
| 3,201,373 | 8/1965 | Kaizerman | 260/80.81 |
| 3,288,763 | 11/1966 | Waldron | 260/86.1 E |
| 3,397,193 | 8/1968 | Aloia | 260/80.81 |
| 3,455,887 | 7/1969 | Levine | 260/80.81 |
| 3,463,751 | 8/1969 | Hasegawa | 260/23 AR |
| 3,488,331 | 1/1970 | Jorgensen | 260/86.1 E |
| 3,624,058 | 11/1971 | Jorgensen | 260/86.1 E |

Primary Examiner—Joseph L. Schofer
Assistant Examiner—Herbert J. Lilling
Attorney, Agent, or Firm—Charles J. Fickey

[57] ABSTRACT

Dry, free flowing, relatively non-compactible granules of an acrylate elastomer prepared by adding to an aqueous suspension polymerization system a divalent metal salt of a long chain fatty acid, and optionally an anti-caking agent.

8 Claims, No Drawings

FREE-FLOWING BEADS OF PARTICLES OF AN ACRYLATE ELASTOMER

This invention relates to dry, free-flowing, relatively non-compactible granules of an acrylate elastomer prepared by an aqueous suspension polymerization system.

Both natural and synthetic rubber are traditionally processed by the rubber manufacturer in the form of solid bales or slabs. The incorporation of carbon black into the rubber, a process defined herein as processability, requires a considerable expenditure of energy to break down the rubber and disperse the carbon black therein. Elastomers as a class are sticky and there is the inherent tendency to compact or fuse into a solid mass regardless of how the elastomer is made. Thus, when an aqueous emulsion or latex is obtained, such as in an emulsion polymerization system, and the elastomer isolated by coagulation, the particles fuse and form a solid mass on drying. Moreover, when solution polymerization is used and the elastomer is isolated from solution, the same result is obtained.

Attempts have been made in the past to produce elastomers in a dry, powdered form for easier processability. Many such attempts have been reported. Most effort has been directed towards isolating the elastomer from an emulsion or latex by coagulation in the presence of a modifying agent, or by dissolving the elastomer in a solvent and adding the solution to a precipitating medium containing a modifying agent. For example, Netherlands Pat. No. 7,304,044 describes a method for flowable powdery rubber mixtures whereby a solution of rubber is emulsified with an aqueous dispersion of certain hydroxyl-containing long chain amines, adding carbon black thereto, and distilling the solvent to produce an aqueous dispersion of fine rubbery particles which are then dried. The process is tedious, expensive and impractical, since most elastomers are made in emulsion systems, and the process involves the extra step of dissolving the rubber in a solvent. Also, Belgium Pat. No. 797,429 describes the addition of methylcellulose to rubber latices and the removal of the water to provide a free-flowing rubber. However, the process would require coagulation under high shear conditions to remove the water. There is further described in Japanese Pat. No. 74/20927, a process for coagulation of a synthetic latex by known methods, such as addition of methanol or calcium chloride, after which the coagulated wet crumb is removed, washed with water, ground under high shear conditions with a salt of a long chain fatty acid, and dried.

Acrylate elastomers have become increasingly important over the past decade and now find widespread use in applications where their unique low temperature properties and oil resistance are important, e.g. in seals and gasketing material for automobiles. Acrylate elastomers are typically prepared in emulsion and, as such, require coagulation of the emulsion to free the elastomer. Under these circumstances the rubber tends to fuse and compact into a bale on drying. Acrylate elastomers have also been made in an aqueous suspension polymerization system, whereby the elastomer is obtained in the form of discrete, bead-like particles which are filtered or centrifuged and dried. Unfortunately, the beads tend to stick together and fuse or compact into a solid mass or matt on drying.

Thus, although it has been clearly recognized that a dry, free-flowing, powdery form of an elastomer is desirable, and many attempts have been made to provide such a product, no such product has been satisfactorily produced without significant problems and inefficiencies.

It is the principal object of the present invention to provide free-flowing, dry, powdery acrylate elastomers. It is another object of the invention to provide a simply method for the preparation of dry, free-flowing, powdery acrylate elastomers.

In accordance with the objects of this invention, I have discovered a method for the preparation of dry, free-flowing powdery acrylate elastomers whereby a major proportion of one or more esters of acrylic acid is copolymerized with a minor proportion of a vinyl comonomer containing a vulcanization site, such as an active-halogen atom or epoxy group, in a free radical initiated aqueous suspension polymerization system to produce a suspension of discrete polymer particles; adding to said suspension from about 0.5 to 6 percent, based on the weight of said polymer particles, of an alkaline earth or other divalent metal salt of a long chain fatty acid; centrifuging to remove water; drying the thus treated polymer particles, and adding thereto from about 0.2 to 2 percent by weight of a solid anticaking agent.

Acrylate elastomers prepared in accordance with the process described herein are dry, free-flowing discrete granules or beads which do not compact or fuse together, even under pressure. Processability with carbon black is excellent, with minimum expenditure of mechanical energy.

Any acrylate elastomer which can be prepared by a free radical initiated aqueous suspension polymerization system can be made free flowing in accordance with the process of this invention. Preferred acrylate elastomers are those prepared by copolymerization of a major proportion of one or more esters of acrylic acid, optionally one or more vinyl monomers copolymerizable therewith in minor amounts, such as acrylonitrile, and a minor proportion of a vinyl monomer containing an active halogen atom, e.g. vinyl chloroacetate or vinyl 2-chloroethyl ether. Such acrylate elastomers are described in Kaizerman, U.S. Pat. No. 3,201,373; Aloia et al, U.S. Pat. No. 3,397,193. Polymers may be made containing minor amounts of a vinyl monomer containing an epoxy group, such as allyl glycidyl ether. Polymers containing minor amounts of vinyl chloroacetate are especially preferred.

The alkaline earth or other divalent metal salts of long chain fatty acids include the zinc, calcium, barium and strontium salts of long chain fatty acids, particularly $C_{12}$ to $C_{20}$ carbon atom fatty acids, and especially calcium stearate.

The metal stearate is preferably added as an aqueous dispersion following completion of the polymerization reaction and prior to filtration or centrifugation. To facilitate preparation of the dispersion it is desirable but not essential to prepare the dispersion in an aqueous solution of a soap, such as sodium oleate. The concentration of the metal salt dispersion added is not critical, so long as it is added to the polymer suspension in an amount of from about 0.5 to 6 percent, based on the weight of the polymer. Alternatively, the metal salt may be added in a manner such that the polymerization takes place in its presence. Or, the polymer particles may first be filtered or centrifuged, washed with water, reslurried in water and the metal dispersion added thereto.

The addition of 0.5 percent of the metal salt provides a granular, free-flowing product which, however, shows a slight caking tendency under a high static load, as which many bags of the granular elastomer are stacked on one another. The addition of 6 percent greatly improves the resistance to caking even under high static loads. More than 6 percent is generally not harmful, but does not result in any improvement to caking resistance. Intermediate levels may be chosen depending on the static load to be expected in shipping and storage.

It is desirable, although not required, to further enhance the non-compacting properties of the polymer, to add a minor amount of a compound to prevent agglomeration or caking, such as fumed silica. When used, a small amount of such material, preferably fumed silica, is dry blended with the polymer particles. Such small amount may be 1 or 2 percent, based on weight of polymer particles.

The specific Examples will further illustrate the invention.

EXAMPLE 1

To 666.6 parts water was added 0.333 part of polyvinyl alcohol (Elvanol 52-22, duPont). The temperature was raised to 83°C. and 6.66 parts calcium stearate was added and dispersed therein. A solution of 68.3 parts ethyl acrylate, 15.0 parts vinyl chloroacetate and 0.33 part benzoyl peroxide was added and the temperature adjusted to 80°C. After 3 minutes a solution of 248.33 parts ethyl acrylate and 1.66 parts vinyl chloroacetate was added dropwise over a period of 30 minutes keeping the temperature at 80°C., and the reaction mixture held at 80°C. for an additional 30 minutes following complete addition of the second solution. The temperature was raised to 95°–97°C. for 5 minutes and the reaction mixture cooled to room temperature, the product filtered and dried at 80°C. for 4 hours. The resulting dried polymer in the form of "beads" was non-tacky, even at 80°C., would not stick to itself or other objects, including glass, and was free-flowing.

EXAMPLE 2

A polymer composition was prepared as in Example 1 except that the calcium stearate was omitted. To the slurry of polymer beads just prior to filtration was added 1 percent, based on the weight of the polymer solids, of calcium stearate. The slurry was then stirred for about 1 hour and the polymer was recovered by centrifugation. The wet cake from the centrifuge was easily broken, showed no tendency to stick together, and was readily separated as free-flowing particles.

To the damp beads was added 2 percent by weight of Cab-O-Sil (silicon dioxide) and the polymer was dried at 50°C. The dry beads were completely free-flowing and showed no tendency to be compacted, even under pressure.

EXAMPLE 3

A polymer composition prepared as in Example 1, except for the omission of calcium stearate, was centrifuged and washed on the centrifuge with water and then rinsed with a 20% calcium stearate slurry (recycled 3 times). The wet centrifuge cake was dried and screened to remove agglomerates and excess calcium stearate. The polymer was free-flowing and non-compactible.

EXAMPLES 4 – 7

A polymer composition prepared as in Example 1, except for the replacement of calcium stearate with the following:
Barium laurate
Magnesium stearate
Calcium palmitate
Zinc myristate
is also a free-flowing and non-compactible beaded composition.

I claim:

1. In a process for the preparation of an acrylate elastomer by a free radical initiated suspension polymerization system, whereby a major proportion of one or more acrylic acid esters is copolymerized with a minor proportion of one or more vinyl monomers polymerizable therewith, including from about 1 to 10 percent, based on the total weight of monomers, of a monomer containing an active halogen atom or an epoxy group, the improvement consisting essentially of: adding to the reaction mixture of said suspension polymerization system from about 0.5 to 6 parts by weight, based on the total weight of monomers charged, of a divalent metal salt of a $C_{12}$ to $C_{20}$ carbon atom fatty acid as the sole anti-fusing additive, and recovering said acrylate elastomer in the form of free-flowing granules.

2. A process according to claim 1 wherein said fatty acid salt is present during the polymerization reaction.

3. A process according to claim 1 wherein said fatty acid salt is added following completion of the polymerization reaction.

4. A process according to claim 1 wherein said fatty acid salt is calcium stearate.

5. A process according to claim 1 wherein said acrylate elastomer is the product of copolymerization of about 90 to 98 percent of one or more acrylic acid esters 2 to 10 percent vinyl chloroacetate.

6. A dry, free-flowing, granular acrylate elastomer composition consisting essentially of a composition prepared by a free radical initiated aqueous suspension polymerization of a major proportion of one or more esters of acrylic acid and a minor proportion of a vinyl monomer copolymerizable therewith containing an active-halogen atom or an epoxy group, wherein from about 0.5 to 6 percent, based on the weight of polymer particles produced in said polymerization reaction, of a divalent metal salt of a $C_{12}$ to $C_{20}$ fatty acid as the sole anti-fusing additive is incorporated into or onto said polymer particles.

7. An elastomer composition according to claim 6 wherein from about 1 to 2 percent by weight of an anti-caking agent is incorporated therewith.

8. An elastomer composition according to claim 7 wherein said anti-caking agent is fumed silica.

* * * * *